Sept. 9, 1924. 1,508,077
W. J. TAYLOR, JR
SOLDERING MACHINE
Filed June 30, 1922   4 Sheets-Sheet 4
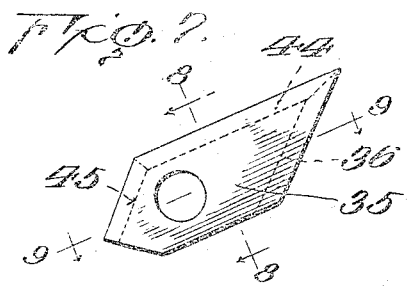
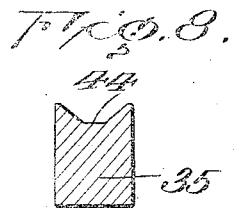
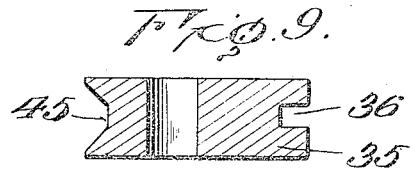
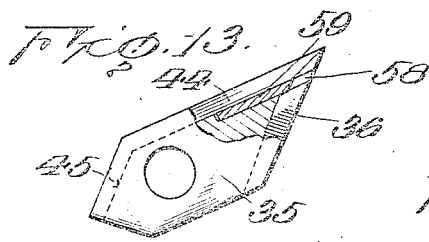
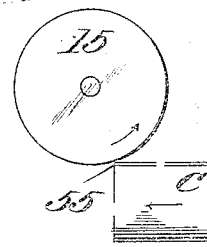 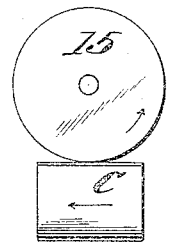 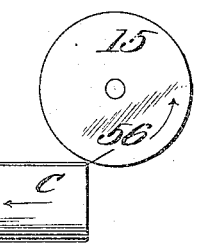
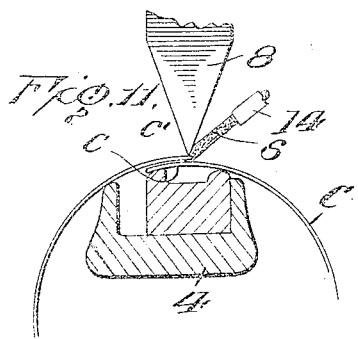
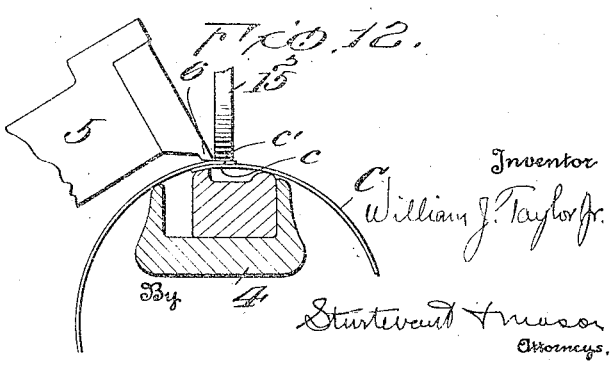
Inventor
William J. Taylor Jr.
By Sturtevant & Mason
Attorneys.

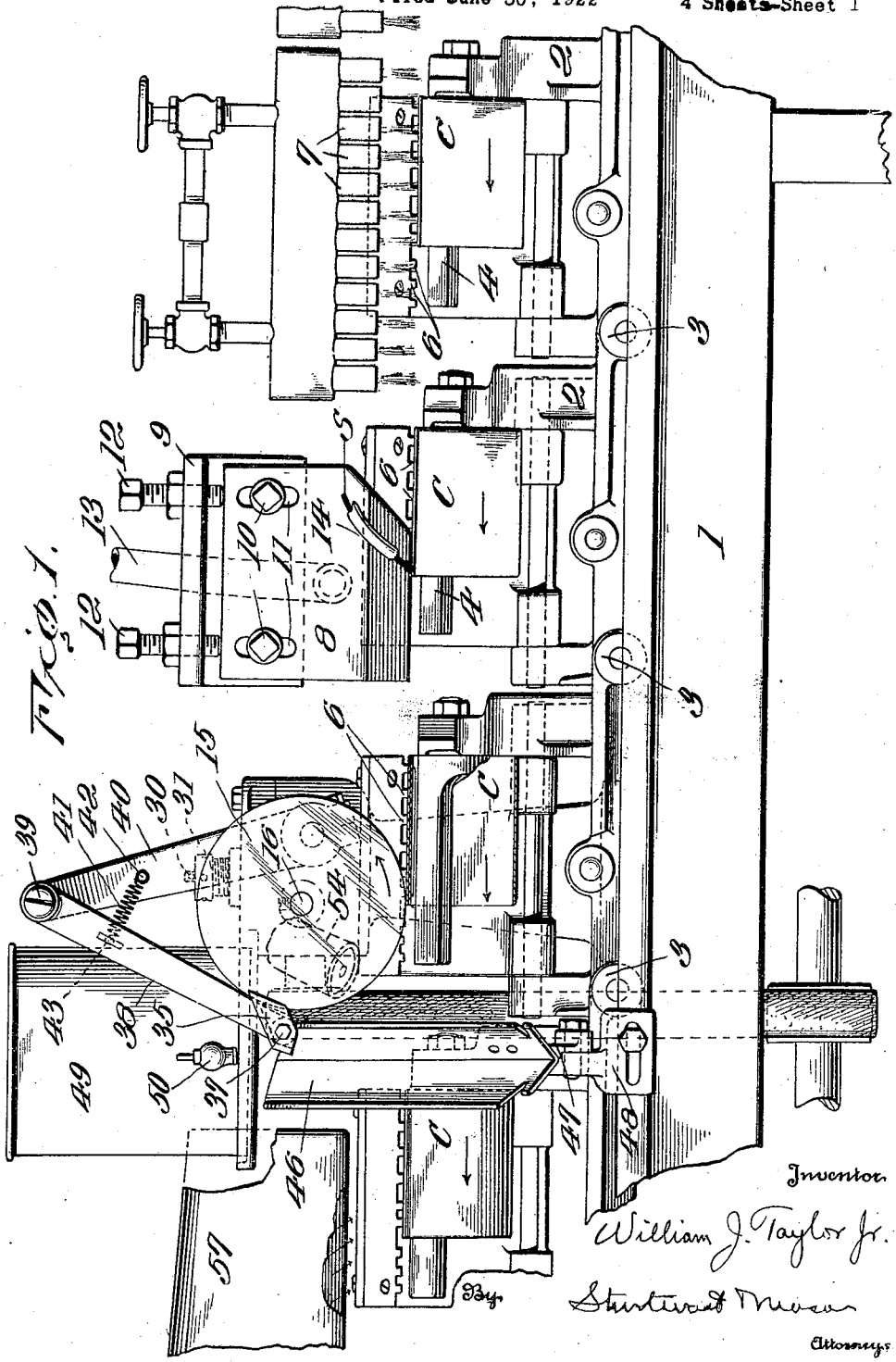

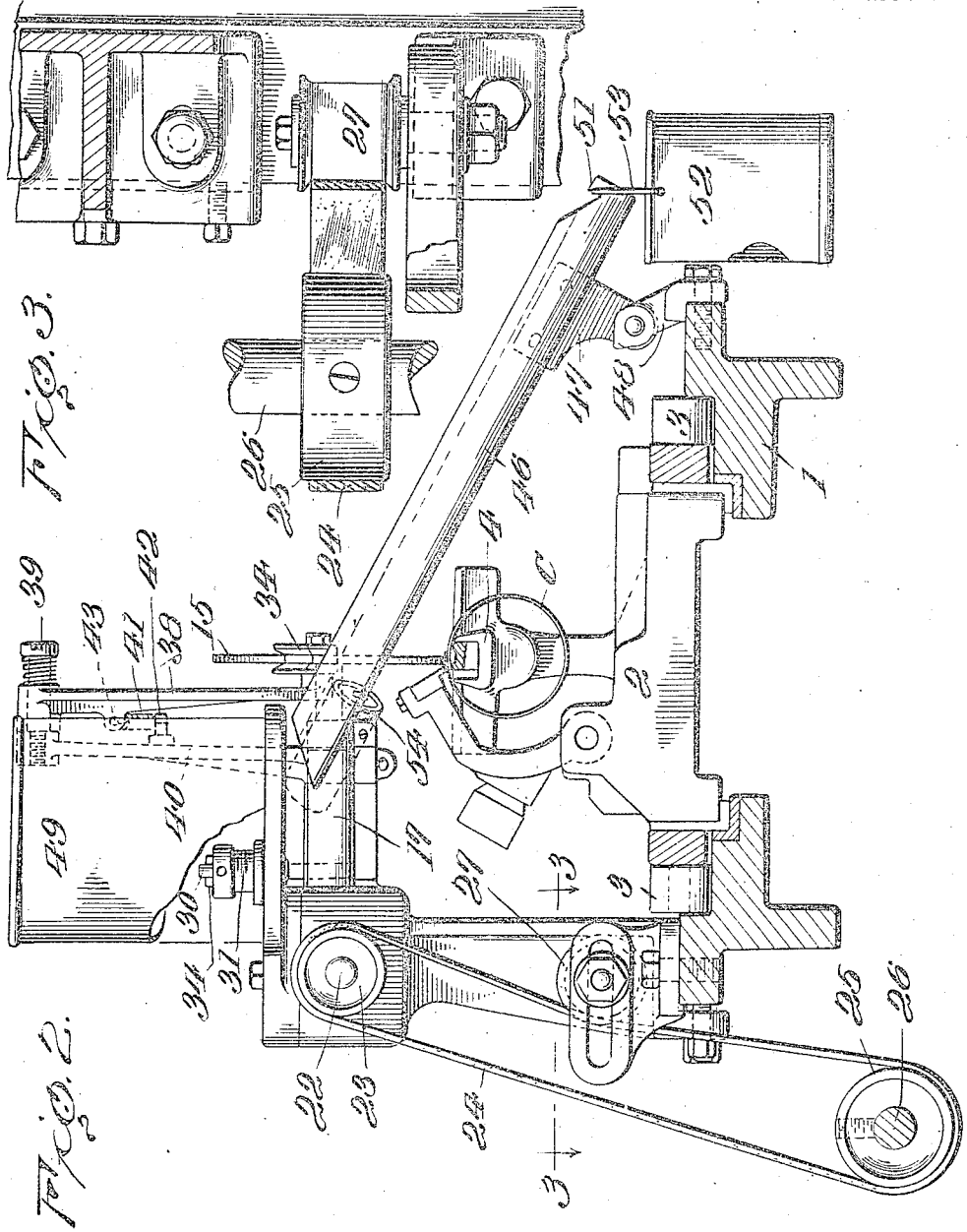

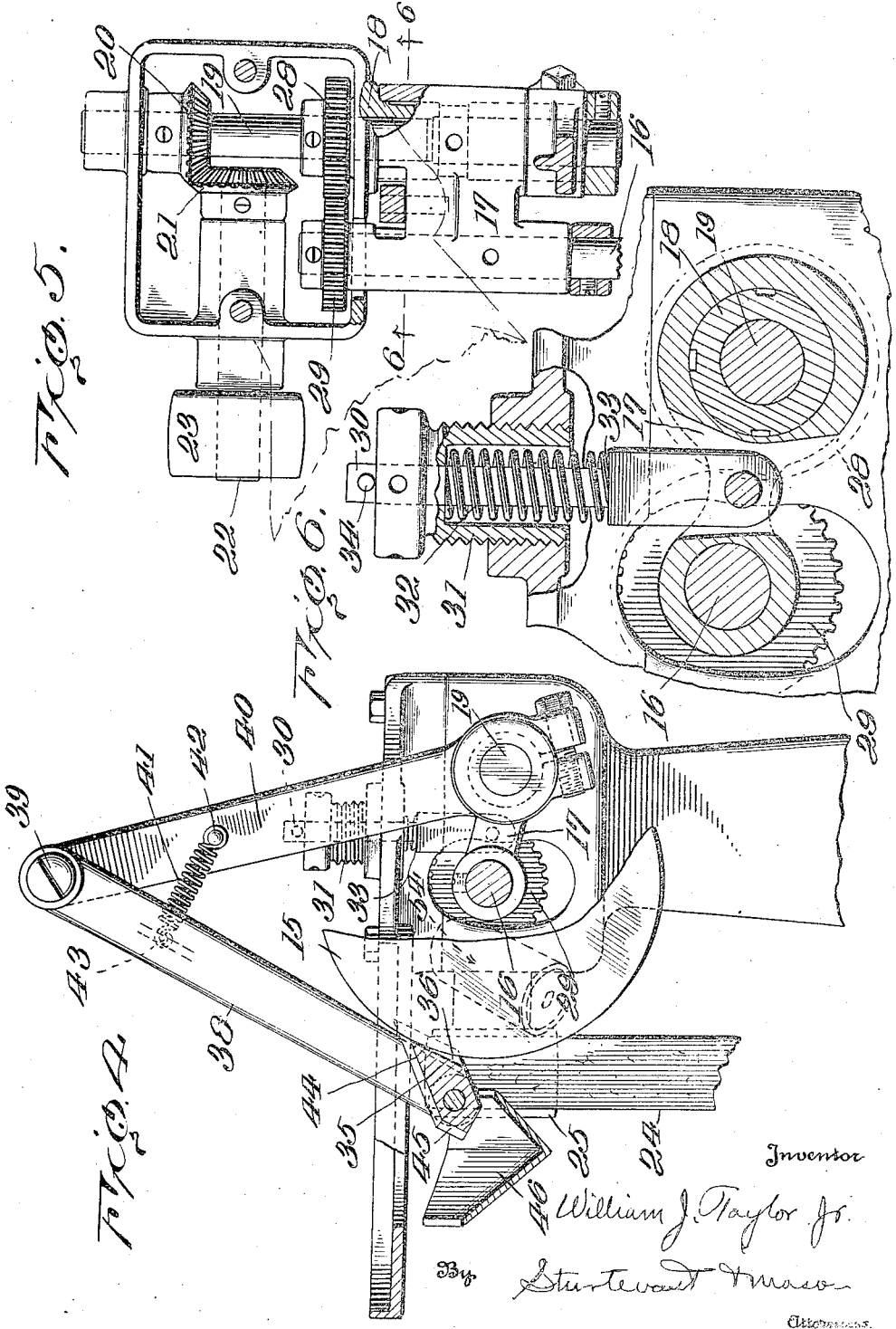

Patented Sept. 9, 1924.

1,508,077

UNITED STATES PATENT OFFICE.

WILLIAM J. TAYLOR, JR., OF BALTIMORE, MARYLAND, ASSIGNOR TO CONTINENTAL CAN COMPANY, INC., OF SYRACUSE, NEW YORK, A CORPORATION OF NEW YORK.

SOLDERING MACHINE.

Application filed June 30, 1922. Serial No. 572,062.

*To all whom it may concern:*

Be it known that I, WILLIAM J. TAYLOR, Jr., a citizen of the United States, residing at the city of Baltimore, State of Maryland, have invented certain new and useful Improvements in Soldering Machines, of which the following is a description, reference being had to the accompanying drawing and to the figures of reference marked thereon.

The invention relates to new and useful improvements in soldering machines, and more particularly to a machine for soldering the seam of a metal can.

An object of the invention is to provide a soldering machine with auxiliary means which contact with the seam after solder has been applied thereto for reclaiming surplus solder, distributing the solder, and bonding the metal parts together.

A further object of the invention is to provide an auxiliary means of the above type with devices for scraping the solder therefrom which is reclaimed from the seam of the can.

A still further object of the invention is to provide a rotating auxiliary device of the above type which is yieldingly pressed toward the can and which rotates in a direction opposed to the travel of the can so as to make a drawing contact with the can.

Another object of the invention is to provide a machine of the above type wherein said auxiliary rotating device is yieldingly pressed against the metal adjacent the seam so as to insure better distribution of the solder between the metal parts and a more perfect bonding of the parts together.

A still further object of the invention is to provide a machine of the above type wherein the rotating solder reclaiming and distributing device is heated so as to impart heat to the solder and the seam to keep the solder molten and to facilitate a sweating in of the solder.

These and other objects will in part be obvious and will in part be hereinafter more fully disclosed.

In the drawings, which show by way of illustration one embodiment of the invention:—

Figure 1 is a side view of a portion of a side seam soldering machine having the improvements applied thereto;

Fig. 2 is a vertical transverse sectional view through a portion of the machine;

Fig. 3 is a section on the line 3—3 of Fig. 2;

Fig. 4 is a view, partly in longitudinal section and partly in front elevation, of a portion of the machine showing the manner of supporting the auxiliary rotating solder distributing device;

Fig. 5 is a view, partly in horizontal section and partly in top plan, showing the manner of mounting and rotating the solder distributing device;

Fig. 6 is a sectional view on the line 6—6 of Fig. 5;

Fig. 7 is a side view of the scraping device for removing the solder from the solder distributing and reclaiming member;

Fig. 8 is a sectional view on the line 8—8 of Fig. 7;

Fig. 9 is a sectional view on the line 9—9 of Fig. 7;

Fig. 10 is a diagrammatic view showing a traveling can body and the rotating solder reclaiming and distributing device as the can body is moved into engagement therewith, when said can body has passed part way beneath said device and just as said can body is leaving said device;

Fig. 11 is an enlarged sectional view showing the can soldering iron applying solder to the side seam;

Fig. 12 is an enlarged transverse sectional view showing the solder distributing and reclaiming device and its path of travel along the side seam; and Fig. 13 is a view, partly in side elevation and partly in section, of a modified form of scraper.

The invention is directed broadly to an apparatus for applying solder to a metal seam. Any of the usual forms of soldering applying mechanisms may be used for applying flux to the seam, after which it is subjected to my improved solder distributing and reclaiming mechanism. Said improved mechanism includes a rotating disk, preferably made of iron, although any suitable material may be used to which solder will adhere. This rotating member is so positioned and supported that it yieldingly bears against the seam; it is also heated. The seam travels underneath the rotating member, said rotating member rotating in a direction opposed to the direction of travel of the seam. As a result, the rotating member makes a drawing contact with the metal, and it is so positioned relative to the seam as to perform three functions: As it is heated it applies heat to the metal parts, and thus insures the continued inflow of the solder or sweating in of the solder, which insures an efficient bonding of the parts. It also distributes the solder along the seam through this drawing movable contact of the said member with the seam. Then again, it takes up the surplus solder by capillary attraction.

Referring more in detail to the drawings, my invention is shown applied to a side seam soldering machine having a main frame 1 along which passes a series of traveling trucks 2. These trucks are pivoted together as indicated at 3, and thus form an endless chain. Each truck carries a short can body supporting horn 4. The can bodies are indicated at C in the drawings. These can bodies are formed about the horns one after the other, so that there is one can body on each horn. The side edges of the can body are overlapped. As shown in Figures 11 and 12, the under overlapped portion is indicated at c, while the upper overlapped portion is indicated at c'. Each truck is provided with a swinging wing or clamping member 5 which is provided with a series of spaced fingers 6, 6 adapted to engage the upper overlapped portion c' of the can body C.

The machine which is shown only in part in the drawings is of the general type shown in the patent granted to I. F. Warme, April 21, 1914, Number 1,094,179, and it is not thought that it will be necessary to describe in detail how the cans are formed and brought to the soldering stations.

Referring to Fig. 1 of the drawings, I have shown a preheating station which consists of a series of burners 7, 7 which direct a jet of flame against the side seam for preheating the same. The can bodies travel in the direction indicated by the arrows. After the seam has been preheated, it passes underneath the soldering iron 8 mounted on a carrier 9 and held in adjusted position thereon by bolts 10, 10 which pass through slots 11, 11 in the iron. Set screws 12, 12 operate to position the iron relative to the can body. The iron is heated by a gas flame issuing from the end of the pipe 13. The solder is indicated at S and is directed to the iron by a suitable solder feeding mechanism, the solder being in the form of a rod and guided to the iron by a tube 14. After leaving the soldering iron, the can body is then presented to the improved solder distributing and reclaiming device 15 which is in the form of a disk and is preferably made of iron. The disk 15 is mounted on a shaft 16. This shaft 16 is journaled to rotate freely in a bracket 17 which is pivoted to turn about a sleeve 18. Mounted in the sleeve 18 is a shaft 19. This shaft 19 carries a bevel gear 20 which meshes with a bevel gear 21 on a short shaft 22. The short shaft 22 carries a belt wheel 23. This belt wheel 23 is driven by a belt 24 which in turn runs over a belt wheel 25 on a driven shaft 26. An adjustable idler 27 engages the belt and places the same under tension.

The shaft 19 carries a gear 28 which meshes with a gear 29 on the shaft 16 so that as the shaft 19 rotates, the shaft 16 will be rotated therefrom through the gears 28 and 29. Inasmuch as the bracket 17 is mounted to turn about the center of the shaft 19, the shaft 16 may raise and lower without interfering with the driving connection, as the gear 29 will merely rotate around the gear 28. The shaft 22 is so driven as to rotate the disk 15 in the direction of the arrow shown in Fig. 1, and it will be noted that the part of the disk adjacent the traveling can body is moving in a direction opposed to the direction of movement of the can body. Connected to the bracket 17 is an upright projecting arm or rod 30. Said rod 30 extends up through a sleeve 31. Located in the sleeve 31 and bearing against the shoulder at the upper end thereof is a spring 32. Said spring bears against the shoulder 33 on the arm or rod 30 and normally forces the same downwardly. A pin 34 extends through the upper end of the arm or rod 30 and limits its downward movement. The sleeve 31 is threaded into the frame of the machine and can be adjusted therein. By adjusting this sleeve, the tension on the spring may be varied so as to force the disk 15 downwardly with a varying degree of yielding force.

Cooperating with the disk 15 is a scraper 35. This scraper 35 is shown in detail in Figures 7 to 9, inclusive. Said scraper is provided with a recess or groove 36 which is adapted to receive the disk 15. The scraper is pivoted at 37 to an arm 38 which in turn is pivoted at 39 to a standard 40, which standard is clamped to the sleeve 18, and this sleeve 18 is formed as a part of the framework so that it is fixed in position. A spring 41 is secured at 42 to the standard 40, and at 43 to the arm 38, and this spring normally forces the arm 38 toward the disk, thus holding the scraper in yielding contact with the disk. Said scraper 35 has a trough-shaped recess 44 along its upper face which leads into the trough-shaped recess 45. As the disk 15 rotates, it will pick up solder where the solder is too thickly distributed upon the seam, said solder adhering to the edge of the disk. As the disk comes in contact with the scraper, this surplus solder taken up by the rotating disk is scraped off, and runs down through the trough 44 into the trough 45, and is discharged from the trough 45 into a stationary V-shaped trough 46. This V-shaped trough 46 is rigidly secured to a support 47 which in turn is fixed to a bracket 48 secured to the frame of the machine. Mounted on the frame of the machine is a receptacle 49 adapted to contain water or other liquid. Said receptacle is provided with a faucet 50 which overhangs the trough 46 and water is allowed to drip from the faucet into the trough. This aids in cooling the solder and causing it to form into small solid globules and roll or run down the trough. The lower end of the trough is provided with a hook-shaped member 51 on which is hung a receptacle 52 by means of a bail 53. The solder drops into this receptacle 53 and is thus reclaimed.

In Fig. 13 of the drawings, I have shown a slightly modified form of the invention in that the scraper is provided with a groove or slot 58, and in this slot or groove 58 is placed the steel knife edge 59 which makes contact with the disk 15 and scrapes the solder therefrom. Said knife edge 59 is on a level with the floor of the trough 54 and the solder scraped off by this knife edge runs down the trough in the manner described above.

The rotating disk 15 as clearly shown in Fig. 12, bears on the upper overlapping section of the can body and adjacent the edge thereof, and as a matter of fact, between the edge and the clamping fingers 6, 6 which clamp the two overlapped sections one on the other. It often happens that the edge of the can body is not curved so as to quite conform to the curvature of the can body, so that the two overlapped edge sections do not make real good contact throughout the entire length of the seam. This rotating disk 15 which is spring pressed down on to the overlapped sections of the can body, will force the two adjacent overlapped surfaces into contact with the solder which has flowed in between the same, and thus insure proper contact and proper seaming of the edges together throughout the entire length of the seam. Then again, the disk is preferably heated by a flame from the pipe 54, and the disk in turn will heat the metal of the can body at the seam or retain the heat in the metal, thus causing the solder to sweat into the seam.

The rotating disk takes up solder by adhesion or capillary attraction and the face of the disk becomes tinned. The scraper takes off a great portion of the solder, but there is still some solder on the edge of the disk, so that, when the next can body comes along, the edge of the disk, as it strikes the advancing can body and moves up onto the overlapped edges, will insure that solder is placed on the extreme forward end edges of the overlapped sections, as indicated at 55 at the right of Fig. 10. This aids in the soldering of the forward end of the seam.

The rotating disk takes up solder from the seam by adhesion or capillary attraction, and particularly prevents the forming of solder lumps or beads at the rear end of the seam or at the point indicated at 56 at the right of Fig. 10. It also aids in distributing the solder throughout the extent of the seam and insures a perfect bonding of the metal parts. After the can body leaves the rotating disk, it passes underneath a cooling hood 57, where the seam is cooled, and thus the soldering of the can body completed.

Instead of lapping the seams, as shown in the drawings, the side seam may have its edges interlocked or may have a combination of interlocked and overlapped edges. Instead of using the apparatus for soldering side seams of cans, it will also be useful in connection with soldering other metal parts, and, therefore, it is obvious that minor changes in the details of construction and the arrangement of the parts may be made without departing from the spirit of the invention as set forth in the appended claims.

I claim:

1. A soldering machine including in combination, means for moving the can bodies endwise through the machine, means for applying solder to the side seam, an auxiliary disk disposed so as to make contact with the side seam, means for rotating said disk at the point of contact in a direction opposed to the direction of travel of the can body, whereby said disk distributes the solder and takes up by adhesion the surplus solder.

2. A lap seam soldering machine including in combination, means for moving the can bodies endwise through the machine, means for applying solder to the side seam, an auxiliary disk disposed so as to make contact with the side seam, means for rotating said disk at the point of contact in a direction opposed to the direction of travel of the can body, whereby said disk distrubutes the solder and takes up by adhesion surplus solder, and means co-operating with said disk for scraping off from said disk the surplus solder taken up thereby.

3. A lap seam soldering machine including in combination means for moving the can bodies endwise through the machine, means for applying solder to the side seam of the can body, an auxiliary disk, means for supporting said disk whereby the same is yieldingly forced into contact with the side seam, and means for rotating said disk in a direction at the point of contact opposed to the direction of travel of the can body.

4. A lap seam soldering machine including in combination means for moving the can bodies endwise through the machine, means for applying solder to the side seam of the can body, an auxiliary disk, means for supporting said disk whereby the same is yieldingly forced into contact with the side seam, means for rotating said disk in a direction at the point of contact opposed to the direction of travel of the can body, and means co-operating with said disk for scraping the surplus solder taken up thereby from said disk.

5. A lap seam soldering machine including in combination means for moving the can bodies endwise through the machine, means for applying solder to the side seam of the can body, an auxiliary disk, means for supporting said disk whereby the same is yieldingly forced into contact with the side seam, means for rotating said disk in a direction at the point of contact opposed to the direction of travel of the can body, means co-operating with said disk for scraping the surplus solder taken up thereby from said disk, said last named means including a trough into which the surplus solder flows, and a tank for intermittently feeding a cooling liquid to the trough for causing the solder to form into solid globules.

6. A lap seam soldering machine including in combination means for moving the can bodies endwise through the machine, means for applying solder to the side seam, an auxiliary disk disposed so as to make contact with the side seams, means for rotating said disk at the point of contact in a direction opposed to the direction of travel of the can body, whereby said disk distributes the solder and takes up by adhesion the surplus solder, and means for heating said auxiliary rotating iron.

7. A lap seam solder machine including in combination means for moving the can bodies endwise through the machine, a soldering iron for applying solder to the side seam, an auxiliary iron disk disposed so as to engage said side seam after the solder has been applied thereto, a swinging bracket on which said auxiliary disk is mounted, means for yieldingly pressing the disk downwardly into contact with the side seam, means for rotating the disk at the point of contact with the side seam in a direction opposed to the direction of travel of the can body.

8. A lap seam solder machine including in combination means for moving the can bodies endwise through the machine, a soldering iron for applying solder to the side seam, an auxiliary iron disk disposed so as to engage said side seam after the solder has been applied thereto, a swinging bracket on which said auxiliary disk is mounted, means for yieldingly pressing the disk downwardly into contact with the side seam, means for rotating the disk at the point of contact with the side seam in a direction opposed to the direction of travel of the can body, and means for heating said auxiliary iron disk.

9. A lap seam solder machine including in combination means for moving the can bodies endwise through the machine, a soldering iron for applying solder to the side seam, an auxiliary iron disk disposed so as to engage said side seam after the solder has been applied thereto, a swinging bracket on which said auxiliary disk is mounted, means for yieldingly pressing the disk downwardly into contact with the side seam, means for rotating the disk at the point of contact with the side seams in a direction opposed to the direction of travel of the can body, and means for scraping off the surplus solder taken up by said auxiliary iron.

10. A lap seam solder machine including in combination means for moving the can bodies endwise through the machine, a soldering iron for applying solder to the side seam, an auxiliary iron disk disposed so as to engage said side seam after the solder has been applied thereto, a swinging bracket on which said auxiliary disk is mounted, means for yieldingly pressing the disk downwardly into contact with the side seam, means for rotating the disk at the point of contact with the side seam in a direction opposed to the direction of travel of the can body, means for heating said auxiliary iron disk, and a scraper for engaging the edge of said rotating iron disk for scraping the surplus solder therefrom.

11. A lap seam solder machine including in combination means for moving the can bodies endwise through the machine, a soldering iron for applying solder to the side seam, an auxiliary iron disk disposed so as to engage said side seam after the solder has been applied thereto, a swinging bracket on which said auxiliary disk is mounted, means for yieldingly pressing the disk downwardly into contact with the side seam, means for rotating the disk at the point of contact with the side seam in a direction opposed to the direction of travel of the can body, means for scraping off the surplus solder taken up by said auxiliary iron, a trough for receiving the solder scraped from said disk, and a tank for intermittently feeding a cooling liquid to said trough.

12. A lap seam solder machine including in combination means for moving the can bodies endwise through the machine, means for applying solder to the seam and an auxiliary iron disk adapted to engage the side seam after the solder has been applied thereto, means for yieldingly pressing said iron into contact with the side seam, means for rotating said iron at the point of contact with the side seam in a direction opposed to the direction of travel of the can body, a scraping trough adapted to engage the edge of the disk for scraping the surplus solder off from the disk, and a second trough into which the solder scraped from the disk flows, and a tank for feeding the cooling liquid to one of said troughs for cooling the solder.

13. A soldering machine including in combination, means for moving the metal parts of the seam to be soldered, means for applying molton solder to the seam, an iron disk adapted to engage the seam after the solder has been applied thereto, means for rotating said iron disk in a direction at the point of contact with the seam opposed to the direction of travel of the seam, and means for yieldingly pressing the iron into contact with the seam.

14. A soldering machine including in combination, means for moving the can to be soldered through the machine, means for applying molten solder to the side seam of the can, a rotating iron independent of the solder applying means adapted to engage the seam after the solder has been applied thereto and while the solder is still molten, and means for rotating said iron at the point of contact with the seam in a direction opposed to the direction of travel of the can body, and means associated with said rotating iron for scraping the solder adhering thereto therefrom during the rotation of the iron.

In testimony whereof, I affix my signature.

WILLIAM J. TAYLOR, Jr.